(12) United States Patent
Rapoport et al.

(10) Patent No.: US 7,415,052 B2
(45) Date of Patent: Aug. 19, 2008

(54) LOW STRESS, HIGH THERMAL CONDUCTION LASER ROD MOUNTING

(75) Inventors: William R. Rapoport, Bridgewater, NJ (US); Steven Vetorino, Berthoud, CO (US)

(73) Assignee: Honeywell International Inc., Morristown, NJ (US)

( * ) Notice: Subject to any disclaimer, the term of this patent is extended or adjusted under 35 U.S.C. 154(b) by 120 days.

(21) Appl. No.: 11/149,594

(22) Filed: Jun. 9, 2005

(65) Prior Publication Data

US 2006/0245458 A1    Nov. 2, 2006

Related U.S. Application Data

(60) Provisional application No. 60/675,392, filed on Apr. 27, 2005.

(51) Int. Cl.
*H01S 3/04*    (2006.01)

(52) U.S. Cl. .............................. 372/35; 372/34; 372/36

(58) Field of Classification Search ................... 372/34, 372/35, 36, 66
See application file for complete search history.

(56) References Cited

U.S. PATENT DOCUMENTS

| 3,999,867 | A | | 12/1976 | Stabell | |
|---|---|---|---|---|---|
| 4,601,038 | A | * | 7/1986 | Guch, Jr. | 372/34 |
| 4,615,951 | A | | 10/1986 | Bronnes | |
| 7,063,127 | B2 | * | 6/2006 | Gelorme et al. | 165/80.2 |
| 2002/0110166 | A1 | * | 8/2002 | Filgas | 372/36 |
| 2006/0017532 | A1 | * | 1/2006 | Trutna | 335/47 |

FOREIGN PATENT DOCUMENTS

| DE | 10226724 A1 | 1/2003 |
|---|---|---|
| JP | 05167142 A | 7/1993 |

* cited by examiner

*Primary Examiner*—Armando Rodriguez
(74) *Attorney, Agent, or Firm*—Black Lowe & Graham PLLC

(57) ABSTRACT

A mount for suspending a laser medium has a cross section profile. The mount is configured to conduct heat away from the laser medium without imparting undue stress. The mount includes a laser host medium having a first cross section profile. A heat sink defines a bore. The bore has a second cross section profile configured to envelop the first cross section profile and further defines a generally uniform interspace between the first cross section profile and second first cross section profile. An amalgam of a mercury soluble metal is formed to substantially fill the interspace to support the laser host medium.

16 Claims, 4 Drawing Sheets

LOW STRESS, HIGH THERMAL CONDUCTION LASER ROD MOUNTING

PRIORITY CLAIM

This is a utility application based on U.S. provisional application No. 60/675,392 filed Apr. 27, 2005 and incorporated herein by reference.

FIELD OF THE INVENTION

Since the advent of laser pumped lasers by either other lasers, heat removal has been a persistent problem. Suitable pump lasers can be found that pump host laser material where the host exhibits high optical absorption. Operation in such wavelengths has the benefit of minimizing the amount of host laser material, but has the disadvantage of creating a large amount of heat in a small volume. The created heat raises the temperature inside the laser host material, typically to the detriment of the laser output. Engineering of such systems attempts to spread the heat load over a larger volume by alternatively changing the material length, the doping concentration and/or the pump wavelength and/or spatial profile. Longer rod-like systems have emerged as viable candidates, but this type of geometry has created other heat removal challenges.

Typical methods of removing heat from a longitudinally laser pumped laser rod involve mounting it into a thermally conductive block made of a solid metal such as copper.

The best heat transfer occurs when the dimension any gap between the laser host material and the thermally conductive block is minimal, preferably zero. The difference in the values of thermal expansion coefficients of the materials involved along with machining and tolerating errors can cause the materials to contact in an undesirable fashion. This contact can create stress-induced birefringence in the laser host material, lowering the laser performance. Poor or intermittent contact between the two materials can make uniform cooling of the rod difficult and also rapidly increase thermal resistance.

Many laser host materials are cubic or nearly cubic in their crystalline structure or are glass or glass-ceramics. Thermal expansion of laser host materials and the stress of the materials caused by a differential in expansion between the contacted laser host material and any mount or supporting structure induces birefringence in such materials. Stress and strain can alter polarization of light traveling through laser host materials creating depolarization effects. If the laser is required to have a polarized output, stress-induced depolarization term can become one of the largest loss components in the laser. High thermal resistance between the laser host material and the heat sink can create significantly larger peak temperatures within the laser rod reducing performance.

Good heat removal that approaches the ideal state depends on very good thermal contact between the heat sink and the laser host material. Large thermal drops can take place if voids are present or poor contact is maintained. These good interface conditions are desired over the entire operational temperature range of the laser for the planned design, especially over many thermal cycles.

Typical heat sinks comprise high thermal conductivity materials such as copper and aluminum and may exchange the heat through liquid interfaces such as water contact or forced air. Thermally induced problems can arise at the interface between the laser host material and the heat sink material, because they are typically unrelated materials with different thermal expansion characteristics. Machining, polishing, or forming the heat sinks so precisely that a good thermal interface can take place mechanically without voids is very difficult. To the extent that the problem has been addressed, it has been addressed by placing a third material between the laser host material and the heat sink to act as an intermediary. The purpose of this material is to make up for machining errors and physical size differences between the components. Typically, it is very difficult to introduce such materials without creating voids or significantly more complex heat sink structures. Examples of such materials are silicone thermal heat sink compound and Indium alloy foil. Problems related to many of these types of materials are voids, creep, and drying out.

There exists an unmet need in the art for a heat sink and mounting mechanism that efficiently removes heat without creating localized stress at mounting points within the rod of a laser.

SUMMARY OF THE INVENTION

Mercury readily forms amalgams with such high thermally conductive materials as silver and gold. In one embodiment, a laser rod is plated with metals such as silver or gold on the circumferential surfaces. Plating an interior bore of a heat exchanger with a metal such as silver or gold, for example, such that the radius of borehole is minimally larger than radius of the laser rod. Both the rod and heat exchanger bore are then placed in contact with elemental mercury. An amalgam immediately forms at an interface between the plated metal and mercury.

Remaining mercury then pools over the amalgam, due to the cohesive nature of the metal. A plated laser rod readily slides into the borehole. The cohesive nature of the mercury wets the interface creating continuity without voids. The laser rod can then be O-ring sealed or sealed by other means to hold it in position. The mercury will not readily form an amalgam on such materials as nickel and copper, so it only preferentially attaches to surfaces plated only with amalgamating metals such as gold or silver.

A mount for suspending a laser medium has a cross section profile. The mount is configured to conduct heat away from the laser medium without imparting undue stress. The mount includes a laser host medium having a first cross section profile. A heat sink defines a bore. The bore has a second cross section profile configured to envelop the first cross section profile and further defines a generally uniform interspace between the first cross section profile and second first cross section profile. An amalgam of a mercury soluble metal is formed to substantially fill the interspace to support the laser host medium.

In accordance with still further aspects of the invention, the heat sink is plated to deposit a second mercury soluble foil.

In accordance with yet other aspects of the invention, the heat sink is fabricated of the second mercury soluble metal.

In accordance with still another aspect of the invention, wherein mercury amalgamates with a mercury-soluble heat sink.

In accordance with still further aspects of the invention, the mercury is held in an amalgamated solution.

As will be readily appreciated from the foregoing summary, the invention provides a method for supporting a laser medium within a bore of a heat sink. The method includes plating a laser medium to deposit a foil. The foil includes a first mercury soluble metal. The laser medium is inserted into a bore a heat sink defines. The heat sink includes a second mercury soluble metal. Mercury is inserted into a gap the foil and the bore define, the mercury dissolving the first mercury soluble metal and the second mercury-soluble to form an amalgam to support the laser medium.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

By way of overview, a mount for suspending a laser medium has a cross section profile. The mount is configured to conduct heat away from the laser medium without imparting undue stress. The mount includes a laser host medium having a first cross section profile. A heat sink defines a bore. The bore has a second cross section profile configured to envelop the first cross section profile and further defines a generally uniform interspace between the first cross section profile and second cross section profile. An amalgam of a mercury soluble metal is formed to substantially fill the interspace to support the laser host medium.

Figure 1A:
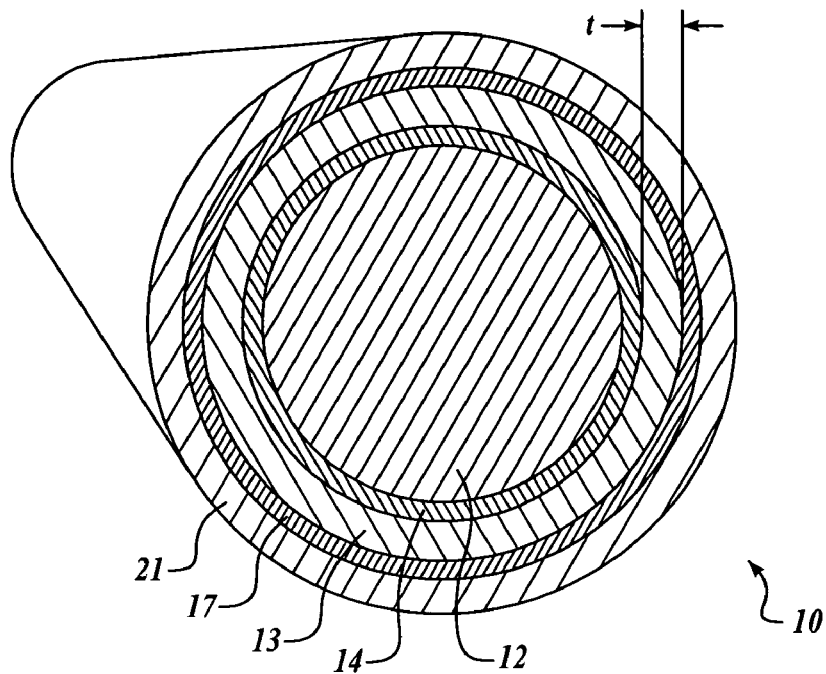
FIG. 1A is a cross-section of an inventive mount before an introduction of mercury.

Referring to FIG. 1A, a mount 10 for suspending a laser host medium 12 has a cross-section profile. An embodiment of the inventive mount 10 is shown, including a laser host material 12, a heat sink 21, a first mercury-soluble foil 14, and a second mercury-soluble foil 17. The first mercury-soluble foil 14 and the second mercury-soluble foil 17 define an interspace 13 between them with a thickness t.

Figure 1B:
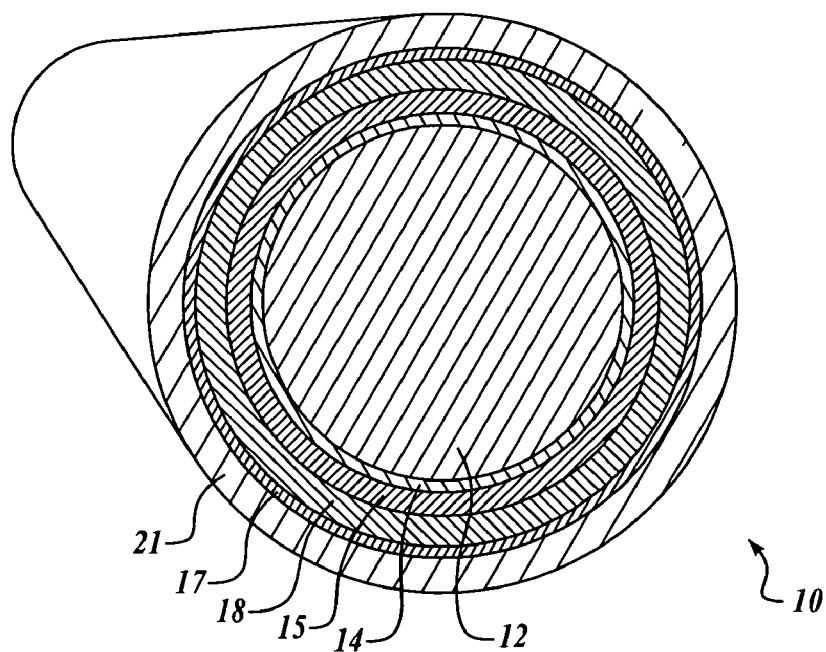
FIG. 1B is a cross-section of an inventive mount after an introduction of mercury.

Referring to FIGS. 1A and 1B, a quantity of mercury is introduced to fill the interspace 13 (FIG. 1A). As a result of the introduction of mercury, portions of the first mercury-soluble foil 14 and the second mercury-soluble foil 17 dissolve into the introduced mercury to form a first amalgam 15 (FIG. 1B) and a second amalgam 18 (FIG. 1B). The amalgams 15, 18 support the laser host medium 12 without introducing large stress due to thermal expansion during operation.

Amalgamation occurs when a mercury-soluble metal such as, for example, silver or gold, is exposed to mercury and as a result of the exposure, an alloy or amalgam is formed. Advantageously, the volume of the resulting alloy is generally the same as the added volumes of the elemental mercury and the elemental metal such as silver or gold that was added. Thus, where mercury amalgamates with the metal foil, the resulting amalgam is thicker to accommodate the added mercury.

Amalgams may either be a very dense viscous liquid or a solid depending upon the physical properties such as the triple point of the resulting amalgam. The most common use for amalgams is in dental fillings where an amalgam of silver and mercury is forced into drilled recesses in tooth enamel to entirely fill the drilled recess thereby preventing the introduction of decay producing residue on enamel surfaces defining the recess.

To suitably exploit the amalgamation of a mercury-soluble metal to support a laser host medium 12, forming an amalgam in place rather than forcing an amalgam around the laser medium 12 allows a reproducible, well-controlled formation of the amalgam, assuring very uniform mechanical contact with the laser host medium.

Figure 2A:
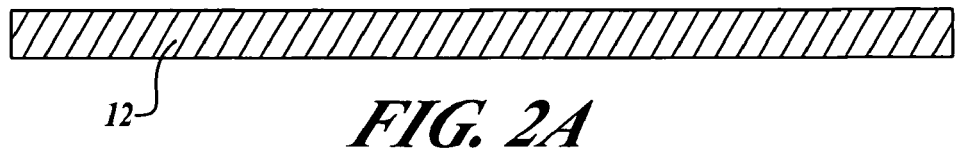
FIG. 2A is a side view of a laser host medium.

Referring to FIG. 2A, the laser host medium 12 is generally elongate in shape. The present invention is not limited to a cylindrical laser host media. The elongate cylinder is used for purposes of non-limiting illustration. The elongate cylinder has two ends that are symmetric.

Figure 2B:
FIG. 2B is a side view of a laser host medium with barrier material.

Referring to FIG. 2B, the laser host medium 12 is coated with a suitable barrier material 16 generally in the area of each of the two ends. The barrier material 16 is selected as a barrier to plating to suitably protect portions of a surface of the laser host medium 12, in the illustrative example, in the general location on each of the two ends. The coating with barrier material 16 leaves only a central portion of the cylinder exposed, to assure that plating will only occur on remaining central portion of the laser host medium 12. The central portion of the laser host medium 12 is selected to allow support along the lateral face of the laser host medium 12.

Figure 2C:
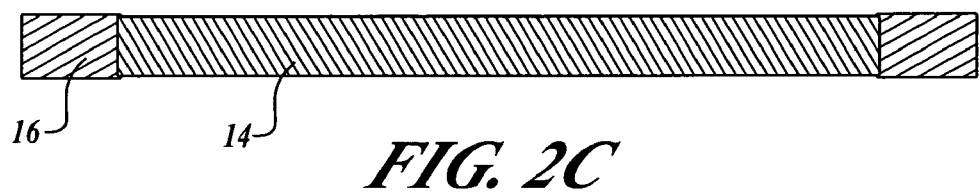
FIG. 2C is a side view of a laser host medium plated with a mercury-soluble foil and having barrier material.

Referring to FIG. 2C, a first mercury-soluble foil 14 is deposited on the laser host medium 12 in the areas that have not been coated with the barrier material 16. The first mercury-soluble foil 14 is deposited by any of several plating methods available. The method to deposit the first mercury-soluble foil 12 is selected to assure any voids between the first mercury-soluble foil 14 and the laser host medium 12 are minimal in number and size. Optionally, a portions of the laser host medium 12 may be plated with a mercury insoluble metal thereby to define a boundary for the later amalgamation.

Figure 2D:
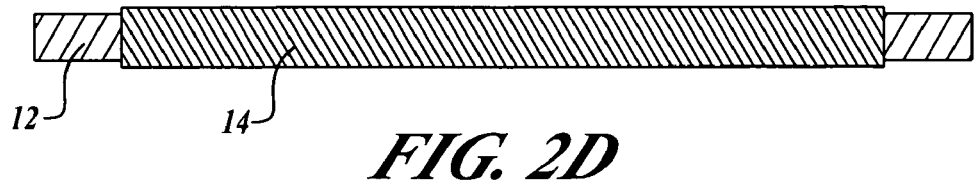
FIG. 2D is a side view of a laser host medium plated with a mercury-soluble foil.

Referring to FIG. 2D, the barrier material is removed from the laser host medium 12 to re-expose the ends of the laser host medium 12.

Figure 3A:
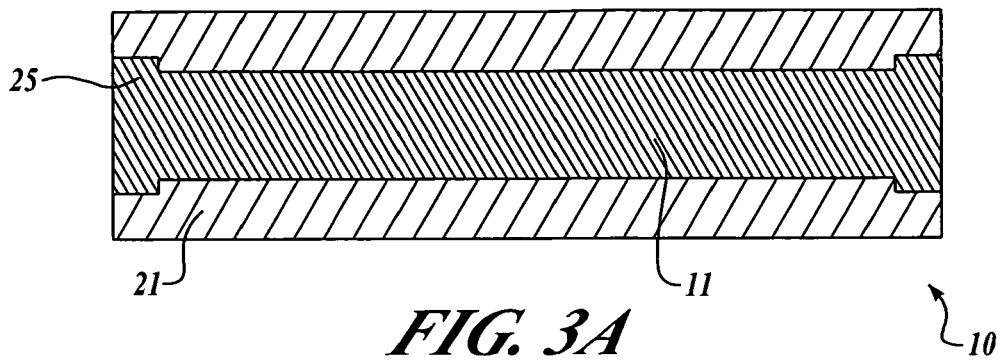
FIG. 3A is cross-section side view of a heat sink.

Referring to FIG. 3A, a heat sink 21 defines a bore 11 passing through the heat sink 21. In an embodiment of the invention, the defined bore 11 also includes at least one counter bore 25 generally at ends of the bore 11. In the selected illustration, a tubular heat sink is described, however, other configurations such as half tubes configured to join in a "clamshell" interlocking engagement will also suitably serve the formation of the mount 10. Other configurations may be selected to afford such heat exchange as is selected. In one embodiment, flow channels are formed to interlock into a surrounding heat sink, the flow channels configured for fluid removal of heat from the heat sink. The resulting flow channels assembly is, however, generally tubular in shape and thus similar to the heat sink 21 portrayed in FIGS. 3A, 3B, 3C, and 3D.

Figure 3B:
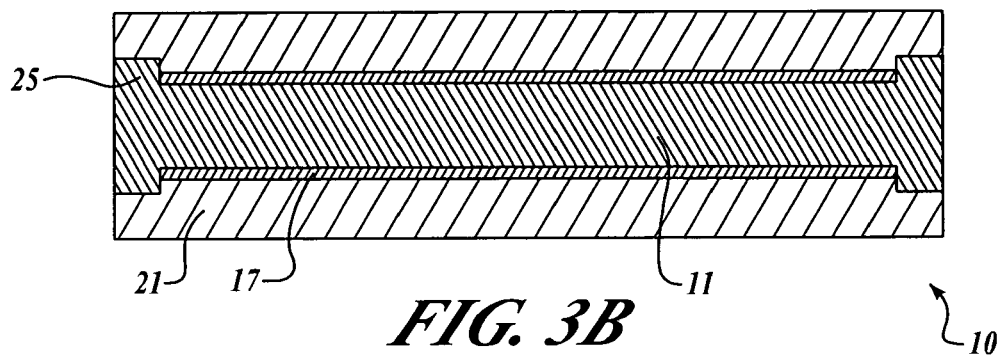
FIG. 3B is cross-section side view of a heat sink with a bore surface plated with a mercury soluble foil.

Referring to FIG. 3B, the interior surface of the bore 11 is plated to deposit the second mercury-soluble foil 17 along the whole of the interior surface of the bore 11. Like the deposition of the first mercury-soluble foil 14 (FIGS. 2C, 2D), deposition means are suitably selected to deposit the second mercury-soluble foil 17, in a manner to assure any voids between the second mercury-soluble foil 17 and the heat sink 21 are minimal in number and size.

Figure 3C:
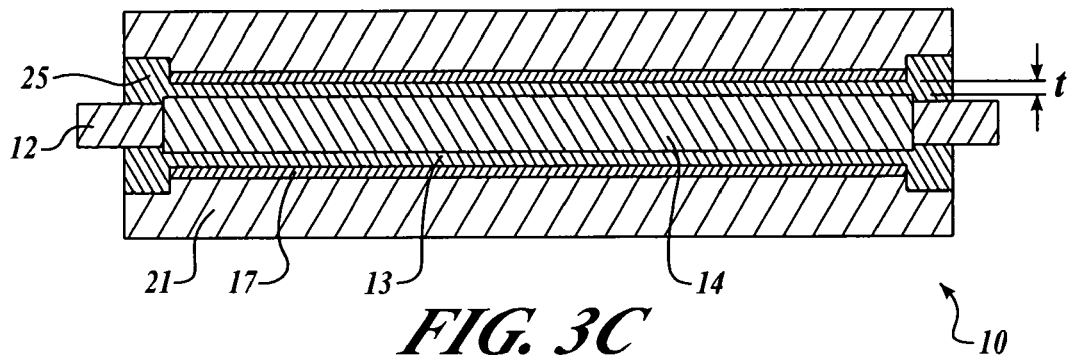
FIG. 3C is cross-section side view of a heat sink with a bore surface plated with a mercury soluble foil including a plated laser host medium.

Referring to FIG. 3C, the laser host medium 12, coated with the first mercury-soluble foil 14, is inserted into the plated bore 11 of the heat sink 21. Between the first mercury-soluble foil 14 and the second mercury-soluble foil-17, the interspace 13 is defined with a thickness t with the insertion of the laser host medium 12. The laser host medium 12 is placed in the bore 11 in order that the thickness t is uniform around the laser host medium 12.

Figure 3D:
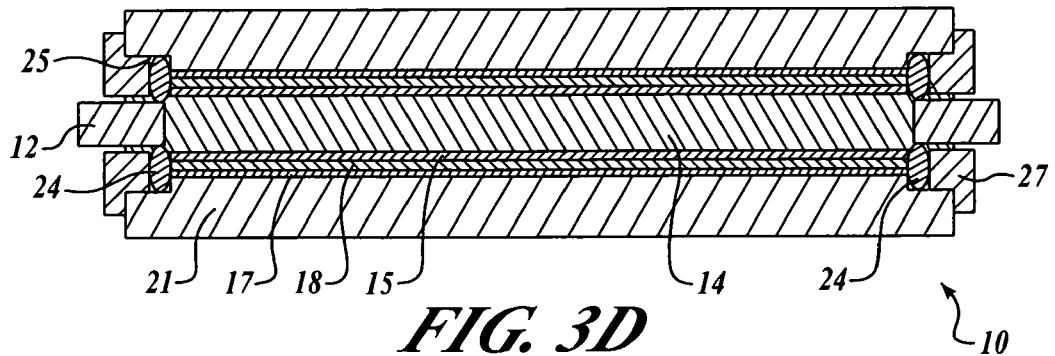
FIG. 3D is cross-section side view of the inventive mount assembly.

Referring to FIG. 3D, the interspace 13 has been filled with mercury that partially to completely dissolved each of the first mercury-soluble foil 14 and the second mercury-soluble foil 17 each to form the first amalgam 15 and the second amalgam 18. In an embodiment, portions of each of the first mercury-soluble foil 14 and the second mercury-soluble foil 17 dissolve to exhaust the mercury in favor of the formed first amalgam 15 and the formed second amalgam 18, though it is not necessary for successful practice of the invention.

In an embodiment of the invention, mercury is provided to dissolve all of the mercury-soluble foil 14 to form advantageously soft amalgams. Experiments indicate that 5-15% of the other metal dissolved in mercury forms a higher viscosity, yet compliant gel-like substance. The resultant gel-like substance has proven to have thermal conduction properties better than mercury alone. Additionally, the presence of mercury after amalgamation in the gel-like material prevents hardening, which might create stress in laser host material 12. If mixing does not take place, then the interface may consist of a harder thin layer of one amalgam type with a high percentage of dissolved metal next to a decreasing hardness compound due to less dissolution of the metal with the mercury.

To seal the mount 10, O-rings 24 have been inserted in the counter bore 25, sealing the first amalgam 15 and the second amalgam 18. The O-rings 24, typically made of a rubber compound, but may be made of any suitable material, such as silicone or Viton™ are used to make the final seal. To urge the O-rings 24 into sealing engagement between the laser host medium 12 and a surface of the counter bore 25, pressure or keeper plates 27 are biased against the O-rings 24. The illustration exaggerates the length of the unsupported laser host medium 12 that extends past the O-rings 24 beyond the length used in practice for non-limiting illustration purposes only.

Figure 4:
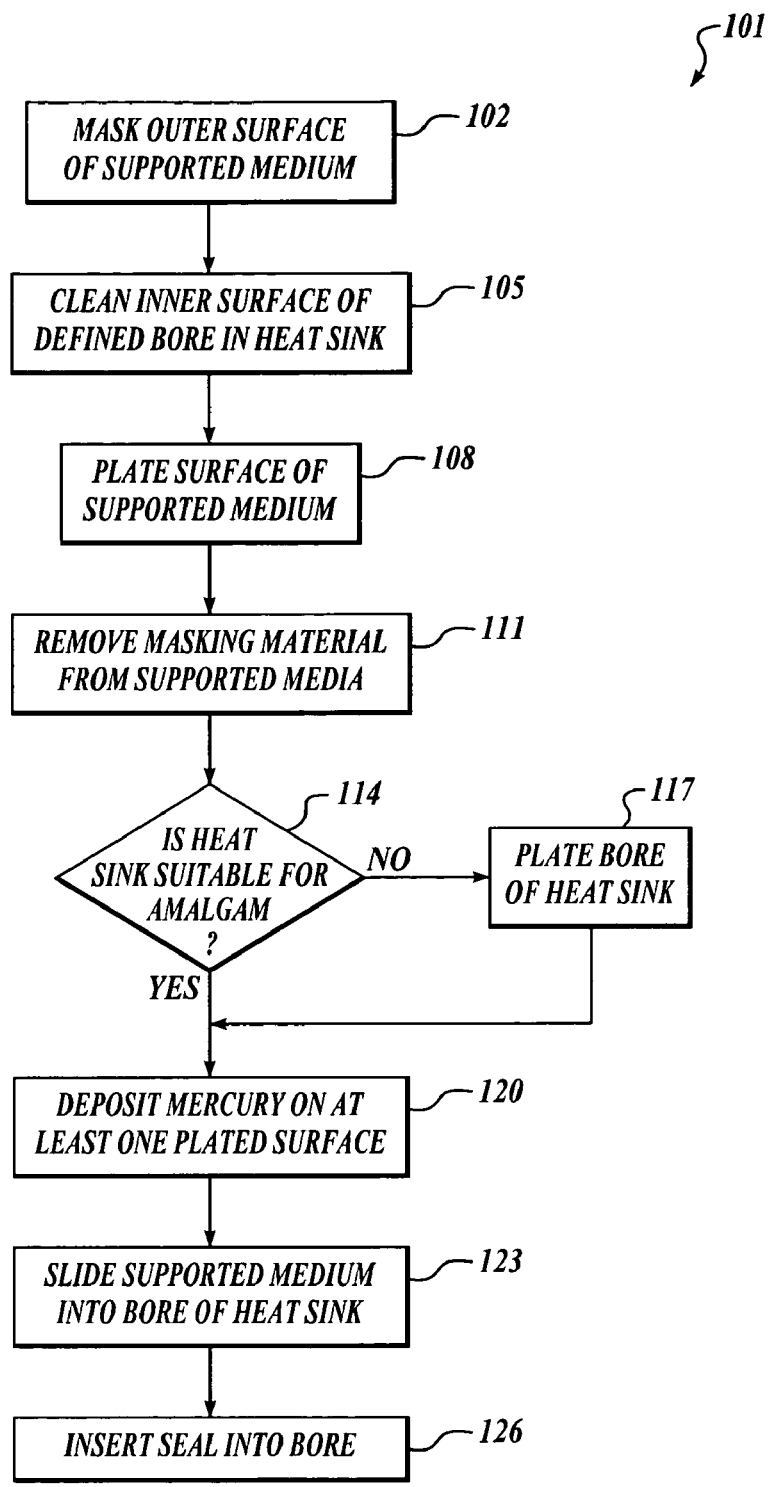
FIG. 4 is a flowchart portraying a method for supporting a laser medium.

Referring to FIGS. 1A, 1B, and 4, a method 101 for forming amalgams to support a laser host medium 12 includes depositing the elemental or alloyed first mercury-soluble foil 14 on a surface of the laser host medium 12. The method 101 suitably exploits a cohesive property of mercury that allows the mercury to flow into the interspace 13 between either the mercury-soluble metal heat sink 21 or plated second mercury-soluble foil deposited in the bore 11 of the heat sink 21 and the first mercury-soluble foil plated on the laser host medium 12.

After flowing into the interspace 13, the mercury forms the first amalgam 15 and the second amalgam 18 to couple to an efficient heat sink 21; the resulting mount 10 formed by the first amalgam 15, the second amalgam 18, and the heat sink 21 supports the laser medium 21 while having a very low and symmetric thermal resistance, thereby introducing negligible stress on the laser host medium 12 as the laser host medium 21 heats in operation.

The method 101 for forming the mount 10 begins at a block 102, where outer surfaces of a supported laser medium 12 are prepared for plating by selectively masking surfaces that in the formed mount 10 will not have contact with the first amalgam 15. Such surfaces would include a pumping port (not shown), configured for the admission of a pumping energy, a high reflector port (not shown), and an output port (not shown) of a laser host medium 12 in operation. The purpose of the masking is to only expose those portions of the laser host medium 12 that will be in contact with the first amalgam 15 in the assembled mount 10.

Masking is the selective placement of a barrier to plating such as a polymeric resin on a surface such as the surface of a laser host medium 12 and is achieved with any coating that will resist the plating. One coating that is advantageously used is photo resist. Photo resist is a photosensitive resin that loses its resistance to chemical etching when exposed to radiation. Irradiation allows selective removal of the photo resist. Because of the ability to selectively remove the photo resist, photo resist is used in such processes for the transference of a circuit pattern onto a surface of a semiconductor chip during production of an integrated circuit.

Photo resist can be accurately placed on a surface for plating and then can be removed later with such solvents as methanol or acetone. Thus in one embodiment, coating the laser host material 12 with a suitable coating of photo resist and irradiating only the surfaces designated for plating. Removing the irradiated photo resist leaves a masking coating on laser host medium 12 only on surfaces designated for plating. Alternatively, selective application of a masking coating by painting a barrier coating on the laser host medium 12 will also suitably mask the laser host medium 12 from plating.

Successful placement of photo resist or other barriers material generally requires that the surface be cleaned to remove all traces of contamination before placement. Contaminants can interfere with adhesion of the masking coating deposited on a surface designated to be reserved from plating and where the adhesion fails, the plating process may deposit a plated foil on the reserved surface of the laser host medium 12 compromising the intended use of that reserved surface.

Generally, where a laser host medium 12 is to be supported by the first amalgam 15 in an assembled mount 10, the barrier material is placed at each of two ends of the laser host medium 12 to allow for formation of a high reflector and an output port. Generally, it is desirable to limit plating only to surfaces where the first amalgam 15 will support the laser host medium 12. Because the first mercury-soluble foil 14 plated on the surface of the laser host medium 12 will dissolve in the presence of mercury, the first mercury-soluble foil 14 serves as a conduit, drawing mercury to follow the plated foil past seals used to contain the mercury upon later assembly.

With the barrier material in place only on designated portions of the surface of the laser host medium 12, the remaining exposed portions of the surface of the laser host medium 12 may optionally be subjected to processes to suitably pit the surface prior to plating. Small pits on the exposed portions of the surface of the laser host medium 12 allow a more secure bond between the laser host medium 12 and a deposited metal foil plated on the laser host medium 12.

At a block 105, a bore of a suitable heat sink is prepared for plating. The heat sink 21 is selected to define a bore that is suitably larger than the diameter of the laser host medium 12 along with the first mercury-soluble foil 14 such that the laser host medium 12 and the first mercury-soluble foil 14 can just slide through the defined bore 11 of the heat sink 21 upon assembly. The heat sink 21 may optionally define as well a counter bore (not shown) to form a shoulder suitable to receive an O-ring seal.

At the block 105, the bore is cleaned to prevent contamination.

At a block 108, the designated surfaces of the laser host medium 12 are plated with the first mercury-soluble foil 14. Mercury-soluble metals include gold, silver, copper, indium, tin, zinc and a few other elements or alloys that can form suitable amalgams. Examples of suitable amalgams can be selected from listings in reference texts as "Binary Alloy Phase Diagrams" ISBN 0-87170-403-X providing phase diagrams for mercury-based alloys with other metals Plating is by a process that is suitably selected from a variety of processes including electrolytic plating, vapor deposition, e-beam deposition, other forms of vapor deposition, chemical deposition, and electro-chemical deposition as well as an electroless silvering process as sold by PEACOCK LABS™ of Philadelphia, Pa.

Materials suitable for plating include gold, silver, copper, indium, tin, and zinc as well as other metals that can form suitable amalgams in the presence of mercury. One such amalgam may be formed by effectively dissolving 10% by weight of silver into the mercury to create a soft paste with 5 times the thermal conductivity as pure mercury. Another heat conductive amalgam is generated by dissolving silver flake (Ferro Corporation™) into mercury and then painting plated foil surfaces with the resulting amalgam. Similarly, an amalgam of gold may be painted onto the plated surfaces since substantial amounts of either silver or gold can be dissolved into mercury. Since some amalgams solidify and turn very hard, (such as the case of dental fillings) at working temperatures, the component metal or alloy is selected according to the desired composition of the final amalgam in order to keep the product in the range of liquid to soft paste.

Copper serves as a less suitable amalgam since only 0.006% atomic copper, by weight, can be dissolved into mercury at room temperature. However, in more complex amalgams, such as amalgams of copper-tungsten, tungsten does not form an amalgam, but in its presence copper will form an amalgam even though the solubility of mercury into copper is very low. Generally, the mercury is supplied in excess to prevent formation of a saturated solution of mercury yielding a softer amalgam. Additionally, there is no need to mix the amalgam to achieve a uniform consistency. Amalgams formed by simple introduction of the mercury are suitable for the inventive purpose.

Wetting cohesive properties of mercury, assures that mercury will eliminate voids between the first amalgam 15 and the surface of the laser host medium 12.

The plating deposits a first mercury-soluble foil of sufficient thickness or depth of plated metal so that the mercury cannot dissolve all of the plated metal before the assembly process is complete. Even at that, empirical evidence shows that foils of even submicron plating thickness are sufficient in depth to allow assembly of the mount.

Plating as set forth at the block 108, may also be performed by applying a thin application of metal to form a foil such as by vacuum depositing or by any other suitable means that create a foil of the desired metallic thickness without introducing voids At a block 111, the remaining photo resist or barrier material (masking material) is removed from the supported medium. Generally, the means of removing the barrier material without degrading the laser host medium 12 is selected based upon the barrier medium used. For instance, photo resist is removed with either methanol or acetone to expose the surface of the laser host medium 12. Where solvent removal is used, the solvent is selected to be inert relative to the laser host medium 12.

At a decision block 114, the material of the heat sink is determined to be suitable for direct amalgamation with the mercury. Where a heat sink, is not itself formed of mercury-soluble metals, a second mercury-soluble foil 17 is deposited on the surface of the bore for formation of the second amalgam 18.

Where the heats sink is not, itself, suitably for amalgamation and a second amalgam 18 is desired, at a block 117, the defined bore of the heat sink is plated to deposit a mercury-soluble foil on the surface of the bore.

Optionally, to further define boundaries for the second amalgam 18, portions of the surface of the bore that will not intentionally contact mercury when assembled may be plated with materials such as nickel that resist amalgamation so that the mercury cannot creep out past the O-ring seal.

A list of appropriate plating materials is essentially the same as the mercury-soluble materials listed in the discussion of plating the laser host medium 12 at the block 108.

With reference to both plating of the laser host medium 12 at the block 108 and the plating of the defined bore of the heat sink 21 at the block 117, a process of complementary plating is often advantageous. Optionally, at boundaries of a surface designated for plating to deposit a mercury-soluble foil, plating a sealing surface immediately contiguous to the deposited mercury soluble foil yields a mercury-inert portion of the surface to further contain the flow of mercury out of the mount 10. At such boundary surfaces of the heat sink 21 to prevent the mercury from creeping past the o-ring seal, by allowing a seal to bear on and seal against the boundary surface. Appropriate foil materials for the complementary plating are nickel, chrome, platinum, and any other non-amalgamating materials.

In one embodiment of the present invention, foil deposited plating at the blocks 108 and 117 is such that an interspace 13 of thickness t is defined between the plated foil surface of the medium relative to the plated surface of the bore and in an embodiment of the invention the interspace gap is very small, on the order of 1 mil. Wetting properties of mercury allow passage of elemental mercury to dissolve the first mercury-soluble foil 14 and the second mercury soluble foil even with t being approximately equal to 1 mil. As discussed above, addition of mercury to dissolve the mercury-soluble foils 14, 17 requires suitable space to accommodate addition of mercury for formation of the first amalgam 15 and the second amalgam 18 that form to fill the interspace gap 13. In practice, while the dimension t of the interspace 13 is not critical to the formation of the amalgam but may be selected to yield a greatest heat transfer coefficient in the assembled mount 10.

At a block 120, mercury deposited in the interspace 13 dissolves the first mercury-soluble foil 14 plated on the laser host medium 12 to form the first amalgam 15 and the second mercury-soluble foil 17 to form the second amalgam 18. Introduction of mercury into the interspace need not be by introducing the mercury into an otherwise assembled mount, the mercury may be introduced, for example, by dipping the host laser medium 12 with its plated first mercury-soluble foil 14 into a vial of mercury, or painting mercury onto the first mercury-soluble foil or by other means. Optimally, mercury is uniformly deposited on the plating and in sufficient quantities to generate a uniform amalgamation across the first mercury-soluble foil 14 and, if present, the second mercury-soluble foil.

Optionally, mercury may be deposited on both the first mercury-soluble foil 14 and, if present, the second mercury-soluble foil 17 to create an amalgam on each. The process is not such as to require the same amalgam on both the first mercury-soluble foil 14 and, if present, the second mercury-soluble foil 17 as an interaction between the first amalgam 15 and the second amalgam 18 will not change the total volume of amalgam generated within the bore of heat sink 21 upon assembly.

At a block 123, the supported medium 12 is slid into the defined bore 11 of the heat sink 21. Mercury's wetting properties allow it to wet each surface, such that in assembly, no void is created supported as the laser host medium 12 is inserted into the heat sink 11.

Advantageously, amalgams remain in a thick viscous liquid phase or in a paste-like soft solid, that does not apply undue stress to the host laser material, even over very wide temperature ranges. For example, melting points for many of the mercury amalgams range is a small radius around −38° C. range, which is well below the operational temperature of many laser systems. In the event the laser system should cool to below that temperature due to environmental conditions, the volumetric shrinkage occurring is quite small.

At a block 126, to prevent the supported medium from sliding back out of the heat sink and, further, to prevent the venting or release of mercury or amalgams, seals such as O-ring seals 24 are seated between the supported laser host medium 12 and the defined surface of the heat sink 21. Optionally, the seals 24 may be packed behind a pressure plate or keeper plate 27 that compresses the O-ring suitably to assure adequate sealing. It is advantageous to rapidly assembly the mounts and to seal the mounts with the O-ring seals 24 in order that the underlying non-wetting materials are not exposed to ambient gases, trapping such gases and thereby reducing thermal conduction.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

While the preferred embodiment of the invention has been illustrated and described, as noted above, many changes can be made without departing from the spirit and scope of the invention. Also, the steps in the process 100 may be performed in various order. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device comprising:
   a cylindrical laser host medium having a circular cross-section and an outer surface;
   a heat sink configured to receive the laser host medium in a cylindrical bore defined by the heat sink, the bore having a bore surface; and
   an amalgam of a mercury soluble metal substantially filling an interspace between the laser host medium and the bore surface of the heat sink.

2. The mount of claim 1, wherein the laser host medium includes a first mercury-soluble foil, the foil being plated generally on the outer surface of the laser host medium.

3. The mount of claim 2, wherein the bore surface is plated with a second mercury-soluble foil.

4. The mount of claim 3, wherein the first mercury-soluble foil and the second mercury-soluble foil include the same mercury-soluble metal.

5. The mount of claim 1, wherein the heat sink is fabricated of a second mercury soluble metal.

6. The mount of claim 3, wherein the first mercury-soluble foil is a distinct mercury-soluble metal from the second mercury-soluble foil.

7. The mount of claim 1, further comprising at least one O-ring seal configured to contain the amalgam in the interspace.

8. The mount of claim 7, wherein a portion of the surface of the laser host medium is plated with a mercury-inert foil, the mercury-inert foil is configured to provide a sealing surface for the O-ring seal.

9. The mount of claim 7, wherein a portion of the bore surface is plated with a mercury-inert foil, the mercury-inert foil is configured to provide a sealing surface for the O-ring seal.

10. A method for supporting a laser host medium within a bore of a heat sink, the method comprising:
    inserting a cylindrical laser host medium into a bore of a heat sink, an outer surface of the laser host medium and a bore surface of the bore define an interspace; and
    forming an amalgam in the interspace, the amalgam configured to substantially fill the interspace.

11. The method of claim 10, wherein forming the amalgam includes:
    plating a first portion of the surface of the laser host medium with a first mercury-soluble metal; and
    introducing mercury into the interspace to form the amalgam with the first mercury-soluble metal.

12. The method of claim 10, wherein forming the amalgam includes:
    plating a second portion of the bore surface with a second mercury-soluble metal; and
    introducing mercury into the interspace to form the amalgam with the second mercury-soluble metal.

13. The method of claim 10, wherein the heat sink is fabricated of a mercury soluble metal.

14. The method of claim 10, wherein forming includes:
    introducing a mercury-soluble metal into the interspace; and
    introducing mercury into the interspace to dissolve the mercury-soluble metal.

15. The method of claim 10, wherein forming the amalgam includes introducing an amalgamated solution of mercury.

16. The method of claim 11, further comprising:
    plating a third portion of the bore surface of the surface of the laser host medium with mercury-inert foil, the mercury-inert foil is configured to provide a sealing surface for the O-ring seal; and
    inserting the O-ring seal to suitably confine the amalgam within the bore.

* * * * *